United States Patent
Lickfold

[11] 3,987,913
[45] Oct. 26, 1976

[54] SIDE LOADER MAST TRAVERSING MECHANISM

[75] Inventor: Peter Lickfold, Leighton Buzzard, England

[73] Assignee: Lancer Boss Limited, Leighton Buzzard, England

[22] Filed: June 15, 1973

[21] Appl. No.: 370,294

[30] Foreign Application Priority Data
June 21, 1972 United Kingdom............... 29097/72

[52] U.S. Cl. ............................................ 214/75 G
[51] Int. Cl.² ............................................ B66F 9/10
[58] Field of Search.............. 214/75 G, 75 R, 75 H, 214/500, 512, 513, 515, 516, 517, 95 R, 670, 730; 187/9, 26

[56] References Cited
UNITED STATES PATENTS
| | | | |
|---|---|---|---|
| 3,424,328 | 1/1969 | Gideonsen et al. | 214/730 X |
| 3,595,409 | 7/1971 | Bowman-Shaw | 214/75 R |

FOREIGN PATENTS OR APPLICATIONS
| | | | |
|---|---|---|---|
| 880,604 | 10/1961 | United Kingdom | 214/75 G |

Primary Examiner—John J. Love
Assistant Examiner—James L. Rowland
Attorney, Agent, or Firm—Karl W. Flocks

[57] ABSTRACT

A traversing mechanism for the mast of a side loader vehicle having a chassis including front and rear wheeled body parts interconnected by a backbone structure with a recess extending transversely of the vehicle between the body parts and having mast guide means along the sides of the recess, the traversing mechanism comprising mast supporting means moveable along the guide means, a prime mover operatively connected to a pair of idler rollers to translate them transversely of the vehicle, freely rotatable rollers journalled to the chassis at one side of the recess one at each end of the path of mast travel, a flexible member anchored at its ends to the chassis and passing in succession over one of the idler rollers, both freely rotatable rollers, and the other idler roller, the flexible member having a reach secured to the mast supporting means, whereby movement of the idler rollers by the prime mover will cause the flexible member to translate the mast supporting means along the guides.

One of the freely rotatable rollers is fast in rotation with a shaft rotatably mounted with respect to the chassis and extending across the recess out of the path of travel of the mast, a roller on the opposite side of the recess is fast on the shaft, another freely rotatable roller is journalled on the chassis remote from the shaft, and a second flexible member is provided and secured to the mast supporting means and passes over the two said freely rotatable rollers.

4 Claims, 5 Drawing Figures

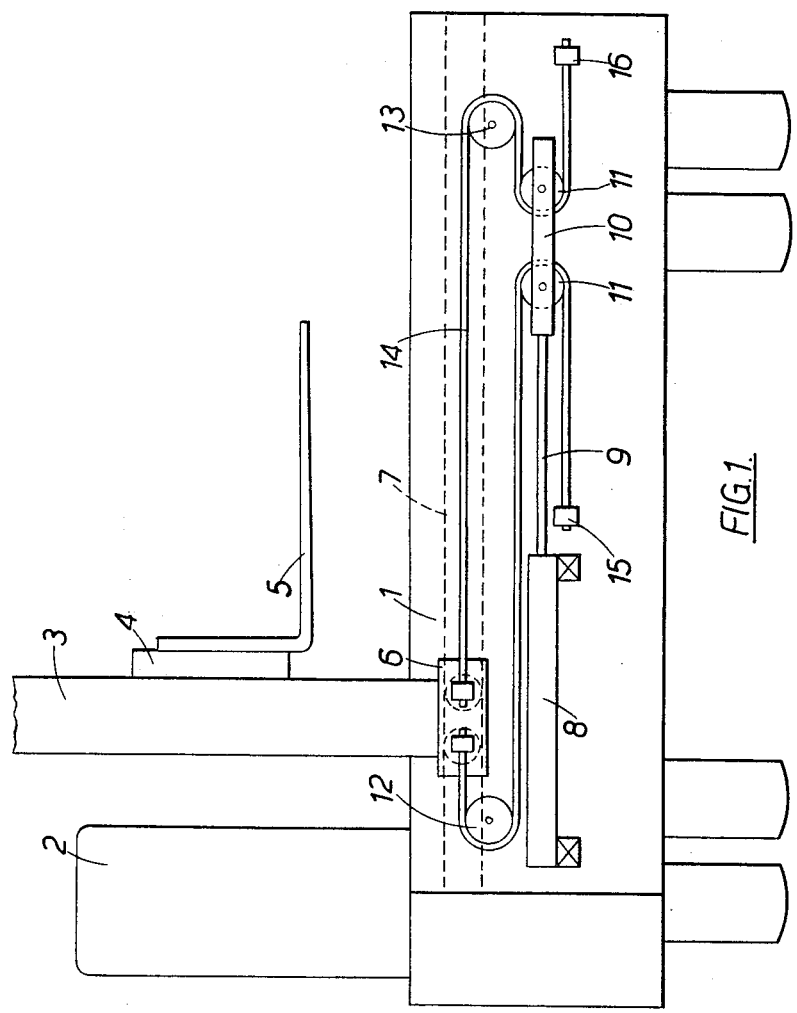

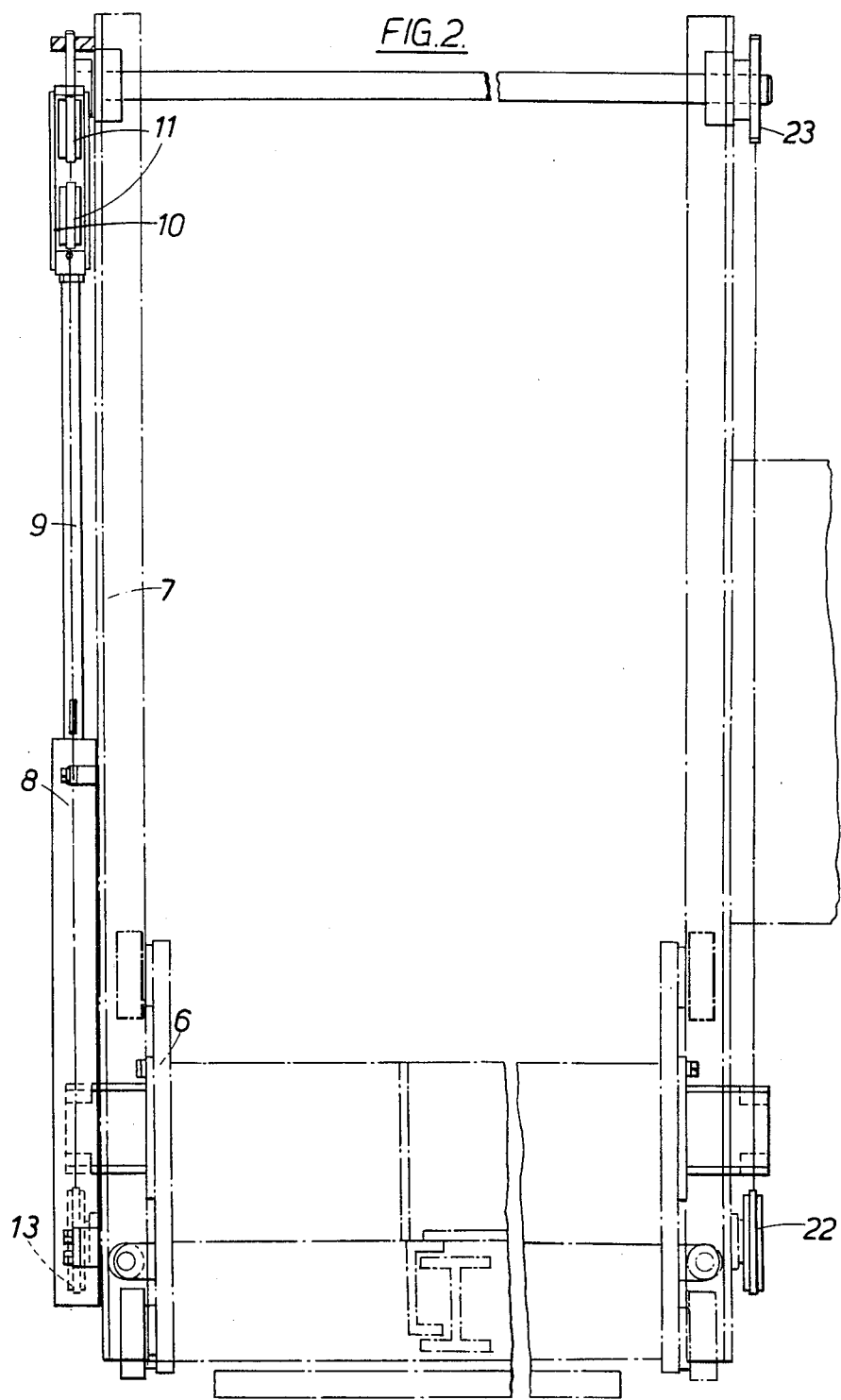

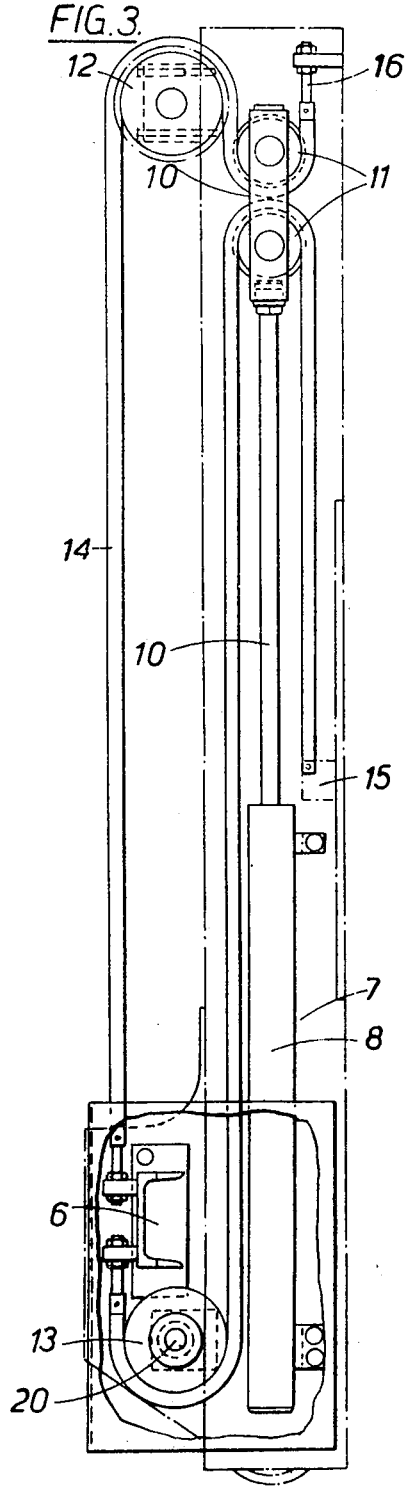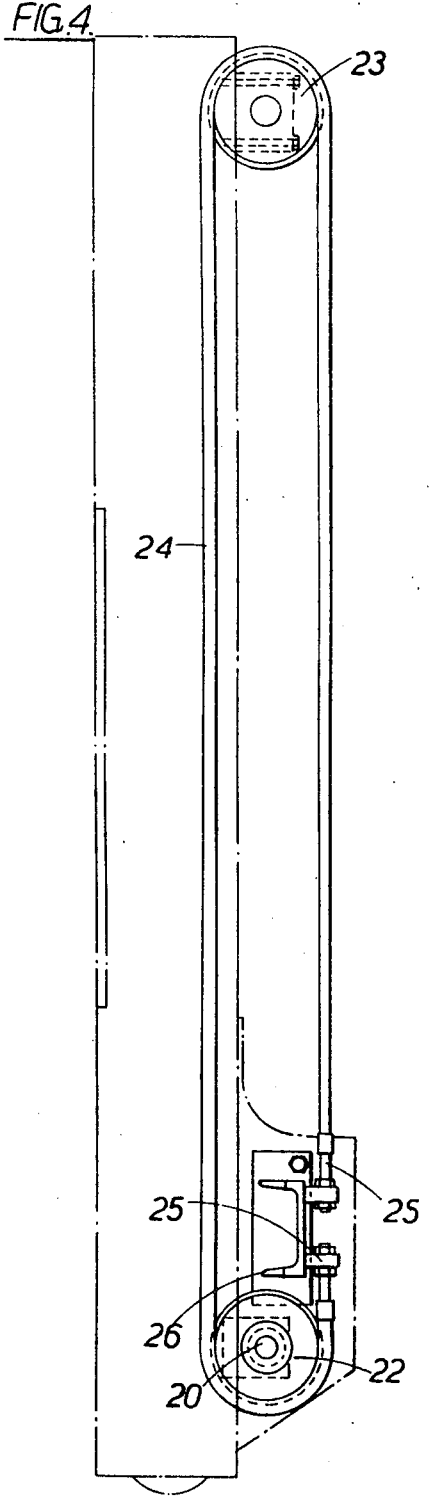

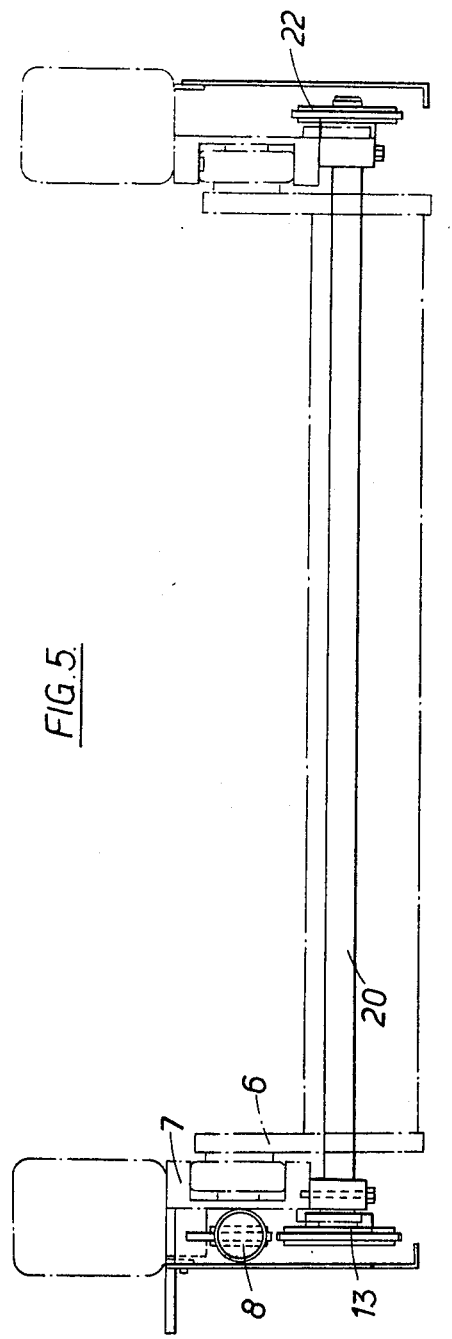

SIDE LOADER MAST TRAVERSING MECHANISM

BACKGROUND OF THE INVENTION

1. Field of the Invention

This invention relates to side loader vehicles which are provided with a fork lift or similar load lifting means mounted on a mast which may be traversed in a recess across the vehicle from an inoperative position within the recess to an operative position on one side of the vehicle.

This invention is more particularly concerned with the traversing means for the mast.

The main object of the present invention is to provide an improved mast traversing mechanism for a side loader vehicle.

SUMMARY

According to the present invention a traversing mechanism for the mast of a sideloader vehicle having a chassis including front and rear wheeled body parts interconnected by a backbone structure with a recess extending transversely of the vehicle between the body parts and having mast guide means along the sides of the recess, the traversing mechanism comprising mast supporting means moveable along the guide means, a prime mover operatively connected to a pair of idler rollers to translate them transversely of the vehicle, freely rotatable rollers journalled to the chassis at one side of the recess one at each end of the path of mast travel, a flexible member anchored at its ends to the chassis and passing in succession over one of the idler rollers, both the freely rotatable rollers, and the other idler roller, the flexible member having a reach secured to the mast supporting means, whereby movement of the idler rollers by the prime mover will cause the flexible member to translate the mast supporting means along the guides.

In a preferred construction the mast support means comprises a trolley or like device moveable in the guides extending along the recess and has means for connecting the trolley to the flexible members.

The flexible member may be an endless chain with a part fast with the mast and to the vehicle. The chain means may pass round rollers mounted on the chain support device. Alternatively the chain means is a single length and is anchored to the mast and the vehicle.

In this Specification the term "flexible member" is to be understood to include any flexible element such as a chain or cable.

BRIEF DESCRIPTION OF THE DRAWINGS

FIG. 1 is a diagrammatic section through a side loader vehicle showing a mast traverse mechanism;

FIG. 2 is a plan view of a second form of mast traverse mechanism of a side loader vehicle;

FIG. 3 is an elevation looking from the left in FIG. 2;

FIG. 4 is an elevation looking from within the recess toward the right in FIG. 2; and, FIG. 5 is an elevation looking from the bottom of FIG. 2.

In the drawings the same references are used to designate the same or similar parts.

DESCRIPTION OF PREFERRED EMBODIMENTS

Referring to the drawings, FIG. 1 shows the body 1 of the side loader vehicle chassis with the engine or drivers cab indicated at 2. The fork mast 3 with its fork carriage 4 and forks 5 is mounted on a trolley 6 which moves in guides 7 in the central recess across the vehicle in a known manner. A similar mast support is found at the other side of the recess as seen in FIGS. 2 – 5.

A prime mover in the form of an hydraulic ram 8 is fixed to the vehicle chassis adjacent the guide 7 at one side of the recess. This ram has a piston rod 9 to which is connected a tied roller support 10. This support 10 may be fast with the rod 9 to be moved by the ram back and forth across the vehicle or it may move along guides (not shown) adjacent to and substantially parallel with the guide 7.

The support 10 has two rollers 11 journalled therein which are normally idler rollers, so that the rollers 11 are mechanically tied together.

Adjacent the prime mover or ram 8 two tied idler rollers 12, 13 are mounted one at each end or beyond the end of the full length of the path of travel of the mast trolley 6.

A flexible member shown as a length of chain 14 has one end 15 anchored to the vehicle preferably as shown adjacent the end of the ram while its other end is anchored at 16 to the chassis adjacent the other end of the path of mast travel. Between its anchors 15, 16 the chain passes round the rollers 11, 12 and 13 and at its upper reach is secured to the trolley 6. If desired the chain is broken at the trolley 6 and its broken ends are each secured to the trolley 6.

While the ram 8 is shown fixed at the inner end of the chassis mast recess, it may be reversed so that it is at the outer end of the recess. To augment the power of the ram or in replacement of the ram one or more of the rollers may be driven as by electric motors or hydraulic motors.

It will be seen that by operating the ram or other driving device or motor the support 10 is made to traverse the vehicle so that the chain moves round all the rollers and causes the trolley 6 to traverse the vehicle in the guide 7.

One mechanism is described at one side of the vehicle recess but a similar mechanism may be provided at the other side of the recess in which case means are provided to ensure smooth movement of the mast along the guides 7 across the vehicle.

Referring to FIGS. 2 to 5 these show a mast traversing mechanism providing a drive to both mast trolleys one at each side of the recess. The mechanism at the left of FIG. 2 is similar to that in FIG. 1 except that the ram 8, rod 9, support 10 and idler rollers 11 are shown above the mast trolley 6.

The idler roller 13 is fast in rotation on one end portion of a shaft 20 extending between the front and rear body portions of the chassis preferably alongside the backbone structure or it may at another part of the recess for example at the top of FIG. 2 so as to act as a tie between the front and rear body portions, but it must be disposed so as not to interfere with the movement of the mast and the fork carriage on the mast.

A roller 22 is fast in rotation with the right hand end of the shaft 20 in FIG. 2 and in alignment therewith a freely rotatable roller 23 is rotatably mounted on the chassis. A second flexible member 24 runs round the rollers 22, 23 and is anchored at 25 to the second mast trolley 26.

Thus the chain 14 causes rotation of the roller 12 and the shaft 20 so that actuation of the ram 8 causes the mast trolleys to move in unison along the recess.

All the rollers are preferably sprocket wheels when each flexible member is a chain, but it may be a cable or the like.

I claim:

1. For a side loader vehicle having chassis including front and rear wheeled body parts interconnected by a backbone structure with a recess extending transversely of the chassis between said body parts and having mast guide means along the sides of said recess, a mast traverse mechanism comprising mast supporting means moveable along said guide means, a shaft rotatably mounted with respect to said chassis and extending across said recess out of said path of travel of said mast supporting means, a roller fast on said shaft for rotation therewith at each side of said recess, at each side of said recess at the opposite end of said path to said shaft a roller freely rotatably journalled with respect to said chassis, a prime mover mounted on said chassis and operatively connected to a pair of idler rollers to translate them transversely of said vehicle alongside said recess, a flexible member on one side of said recess anchored at its ends to said chassis and passing in succession over one of said idler rollers, both of said freely rotatable rollers, and the other of said idler rollers, said flexible member having a reach secured to said mast supporting means and at the other side of said recess a second flexible member on the other side of said recess passing round said roller on said shaft and said freely rotatable roller on said other side of said recess and having a reach secured to said mast supporting means, whereby movement of said idler rollers by said prime mover causes said flexible members to translate said mast supporting means at both sides of said recess along said guide.

2. A traversing mechanism according to claim 1 wherein said mast supporting means comprises a trolley device moveable along said guides and has means for connecting each of said flexible members to said trolley device.

3. A traversing mechanism according to claim 1 each of said flexible members is a chain.

4. A traversing mechanism according to claim 1 wherein said prime mover is an hydraulic ram and said idler rollers are rotatably mounted on a member fast with the piston rod of said ram.

* * * * *